Patented Apr. 26, 1949

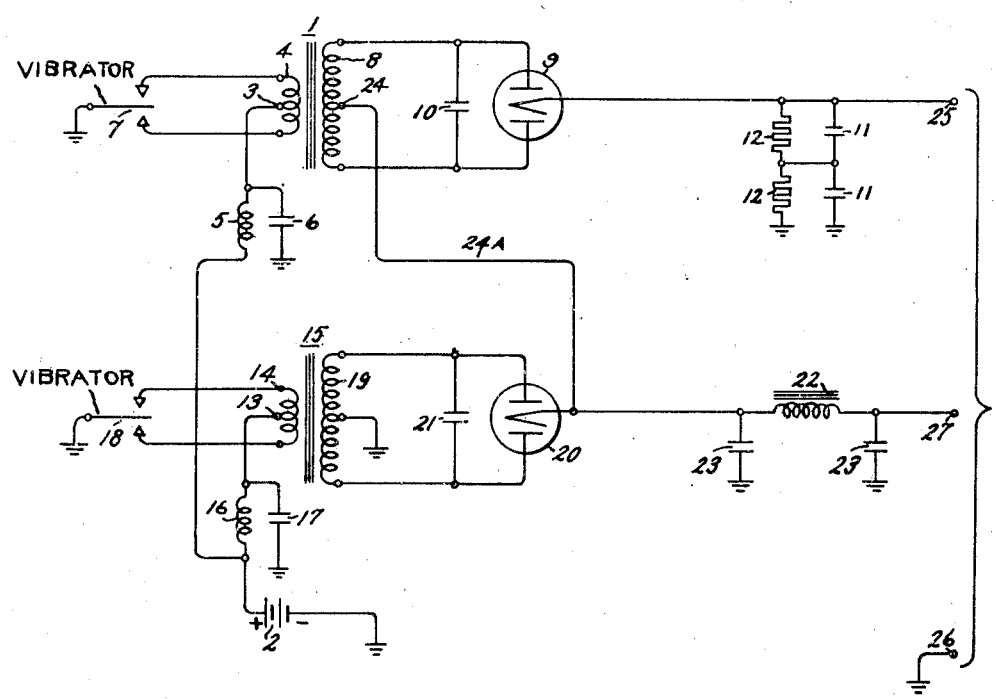

2,468,578

UNITED STATES PATENT OFFICE 2,468,578

VIBRATOR POWER SUPPLY

Leonard O. Vladimir, Baldwinsville, N. Y., assignor to General Electric Company, a corporation of New York Application December 19, 1947, Serial No. 792,819

5 Claims. (Cl. 171—97)

1

This invention relates to power supply systems, and more particularly to systems of the vibrator type in which high unidirectional potentials are obtained from a source of low unidirectional potential.

In the usual type of mobile radio transmitting and receiving systems a storage battery or similar apparatus is usually the only available source of operating potential. It is necessary to provide from this source, various unidirectional potentials required for the different components of the above systems.

It is an object of this invention to provide an improved power supply for such mobile equipment from which the required potentials may be obtained, and in which a relatively low current drain on the potential source is realized.

A further object of this invention is to provide in such a power supply, highly efficient means for obtaining a plurality of unidirectional outputs therefrom, without necessitating the use of power dissipating potential divider impedances.

Yet another object of this invention is to provide means for combining the outputs of a plurality of low potential vibrator systems to derive a plurality of unidirectional potentials therefrom, and wherein the value of the derived potentials may be greater than the output potentials of any one of the individual vibrator systems.

A still further object of this invention is to provide means for combining the outputs of a plurality of vibrator systems to obtain a multiple source of unidirectional potentials, and wherein the power drain for each vibrator system is substantially equal and maximum utility of each of the systems is effected.

The features of this invention which are believed to be new are set forth with particularity in the appended claims. The invention itself, however, together with further objects and advantages thereof may best be understood by reference to the following description when taken in conjunction with the accompanying drawing in which the single figure shows a preferred embodiment of the invention.

Referring now to the figure which shows a power supply circuit embodying the invention and utilizing in the example shown two vibrator systems from which two potential outputs may be obtained, there is designated at 1 a usual power transformer. Unidirectional potential derived from source 2 is applied to the center tap 3 of primary winding 4 through a choke coil 5, this center tap being bypassed to ground for alternating current by capacitor 6. The resulting

2 unidirectional current through the primary 4 is caused to flow from center tap 3 alternately to one extremity and the other of this winding by the conventional vibrator arrangement 7. The actuating means for vibrator 7 is well known and for simplicity is not shown in the figure.

The current flow in the primary winding of transformer 1 gives rise to an alternating current in the secondary winding 8 of this transformer. This alternating current is rectified by device 9, this device being bypassed by a high frequency bypass capacitor 10. The resulting unidirectional output of device 9 is filtered by the usual series connected filter capacitors 11 and series connected resistors 12, as shown.

Similarly, potential from source 2 is applied to the center tap 13 of primary winding 14 of transformer 15 through choke coil 16, the center tap 13 being coupled to ground for alternating current by capacitor 17. Due to the action of vibrator 18, primary winding 14 induces an alternating current in secondary winding 19. The center-tap of secondary winding 19 is connected to ground, and the extremities of this winding are connected to a rectifying device 20 which is bypassed for high frequencies by bypassing capacitor 21. The unidirectional output of rectifying device 20 is filtered by a conventional filtering circuit comprising a choke coil 22 and capacitors 23. The output of device 20 is also impressed on the center tap 24 of secondary winding 8, by way of lead 24A.

In the operation of the apparatus described the unidirectional potential outputs of the individual vibrator systems are combined in series and a unidirectional potential may be obtained between terminals 25—26 which is substantially equal to the sum of the individual output potentials of the vibrator systems. A further potential may be obtained between terminals 27—26 which is substantially the individual output of one of the vibrator systems.

The advantages of the present system may best be appreciated by contrasting the design and operation with that of a conventional power supply designed to supply, for example, currents of 100 milliamperes at 600 volts and 50 milliamperes at 240 volts. In the conventional system a power supply delivering 150 milliamperes at 600 volts would be used, and resistor means incorporated to make available 50 milliamperes at 240 volts. This system dissipates 18 watts of power as heat, necessitating larger vibrators and requiring a higher battery current. It would be difficult to design two separate vibrators to fit the requirements as one supply would be 100 milliamperes at 600 volts, which is above the maximum capabilities of the usual vibrator systems. On the other hand, the output from the second supply would be 50 milliamperes at 240 volts which is less than the minimum capabilities of the usual vibrator systems. By utilizing the arrangement shown in Fig. 1, the circuit requirements are reduced so that the first vibrator system delivers substantially 100 milliamperes at 360 volts, and the second vibrator system delivers substantially 150 milliamperes at 240 volts. It is, therefore, possible to obtain across terminals 25—26 a potential of 600 volts, with a current capacity of 100 milliamperes and to obtain across terminals 27—26, a potential of 240 volts with 50 milliamperes of available current which fulfill the requirement. It can be seen that the current drain from each vibrator system is substantially equal and maximum utility is realized from each system.

While a certain specific embodiment is shown and described, it will of course be understood that various modifications may be made without departing from the invention. The appended claims are therefore intended to cover any such modifications as fall within the true spirit and scope of the invention.

What I claim as new and desire to secure by Letters Patent of the United States is:

1. A power supply system for mobile radio equipment and the like comprising a plurality of vibrator systems and a source of unidirectional potential, each of said vibrator systems comprising, a transformer having a primary winding and a secondary winding, said primary winding being connected to said source, vibrator means included in circuit with said primary winding for causing the unidirectional current in said primary winding to induce an alternating current in said secondary winding, and rectifying means included in circuit with said secondary winding for rectifying said alternating current, means for deriving a unidirectional potential output from one of said vibrator systems, the unidirectional potential output of said one vibrator system being connected in series with the secondary winding potential of the other of said vibrator systems to derive a further unidirectional output of increased potential from said power supply.

2. In a power supply system for providing a plurality of unidirectional potential outputs, a plurality of vibrator systems, a source of unidirectional potential, means for impressing unidirectional potential from said source upon each of said vibrator systems, and each of said vibrator systems comprising, vibrator means for interrupting said unidirectional potential, transformer means for deriving an alternating current from said potential, and means for rectifying said alternating current, means for deriving a unidirectional output from each of said vibrator systems, and a connection between the outputs of said individual vibrator systems for providing further outputs having a higher potential than the individual outputs of said vibrator systems.

3. In combination, a plurality of vibrator power supply systems, and a source of unidirectional potential, each of said systems comprising, a transformer having a primary winding and a secondary winding, means connecting the center point of said primary winding to said source, vibrator means for reversing the current in said primary winding to induce an alternating current in said secondary winding, means for rectifying said alternating current, and means for deriving a unidirectional potential output from each of said vibrator systems, the output of the rectifying means of one of said vibrator systems being connected to the center point of the secondary winding of another of said vibrator systems for deriving a plurality of further unidirectional potential outputs.

4. A power supply system for mobile radio equipment and the like, comprising first and second vibrator systems and a source of unidirectional potential, said first and second vibrator systems each including in combination, a transformer having a primary winding and a secondary winding, means for connecting the center point of said primary winding to said source, vibrator means for reversing the current flow in said primary winding to induce an alternating current in said secondary winding and means for rectifying said alternating current, means coupling the center point of the secondary winding of said second vibrator system to a point of reference potential, means for deriving a unidirectional output potential from said second vibrator system, the output potential of said second vibrator system being connected to the center point of the secondary winding of said first vibrator system for deriving a further unidirectional output, said further output having a potential substantially equal to the sum of the outputs of said vibrator systems.

5. In combination a first transformer and a second transformer, said transformers each having a primary winding and a secondary winding, a source of unidirectional potential, means for connecting said source to the respective center points of said primary windings, vibrator means included in circuit with each of said primary windings for causing the primary current to reverse in said primary windings thereby inducing an alternating current in said respective secondary windings, rectifying means included in circuit with each of said secondary windings, means for connecting the center point of one of said secondary windings to a point of reference potential, means for deriving a unidirectional potential output from the circuit of said one secondary winding, a connection between the output of the rectifying device associated with said one winding to the center point of the other of said secondary windings for superimposing the unidirectional output of said one rectifying device on the alternating current in said other secondary winding, and means for deriving a second unidirectional potential output from said other secondary circuit.

LEONARD O. VLADIMIR.

REFERENCES CITED

The following references are of record in the file of this patent:

UNITED STATES PATENTS

| Number | Name | Date |
| --- | --- | --- |
| 1,451,886 | Nelson | Apr. 7, 1923 |
| 2,410,974 | Huetten | Nov. 12, 1946 |